Nov. 10, 1953

H. E. ROYS 2,658,763

PHONOGRAPH PICKUP DEVICE AND THE LIKE

Filed July 31, 1948

Inventor

HENRY E. ROYS

By Morris A. Rabkin

Attorney

Patented Nov. 10, 1953

2,658,763

UNITED STATES PATENT OFFICE 2,658,763

PHONOGRAPH PICKUP DEVICE AND THE LIKE

Henry E. Roys, Haddon Heights, N. J., assignor to Radio Corporation of America, a corporation of Delaware Application July 31, 1948, Serial No. 41,773

7 Claims. (Cl. 274—35)

Figures 1, 2:
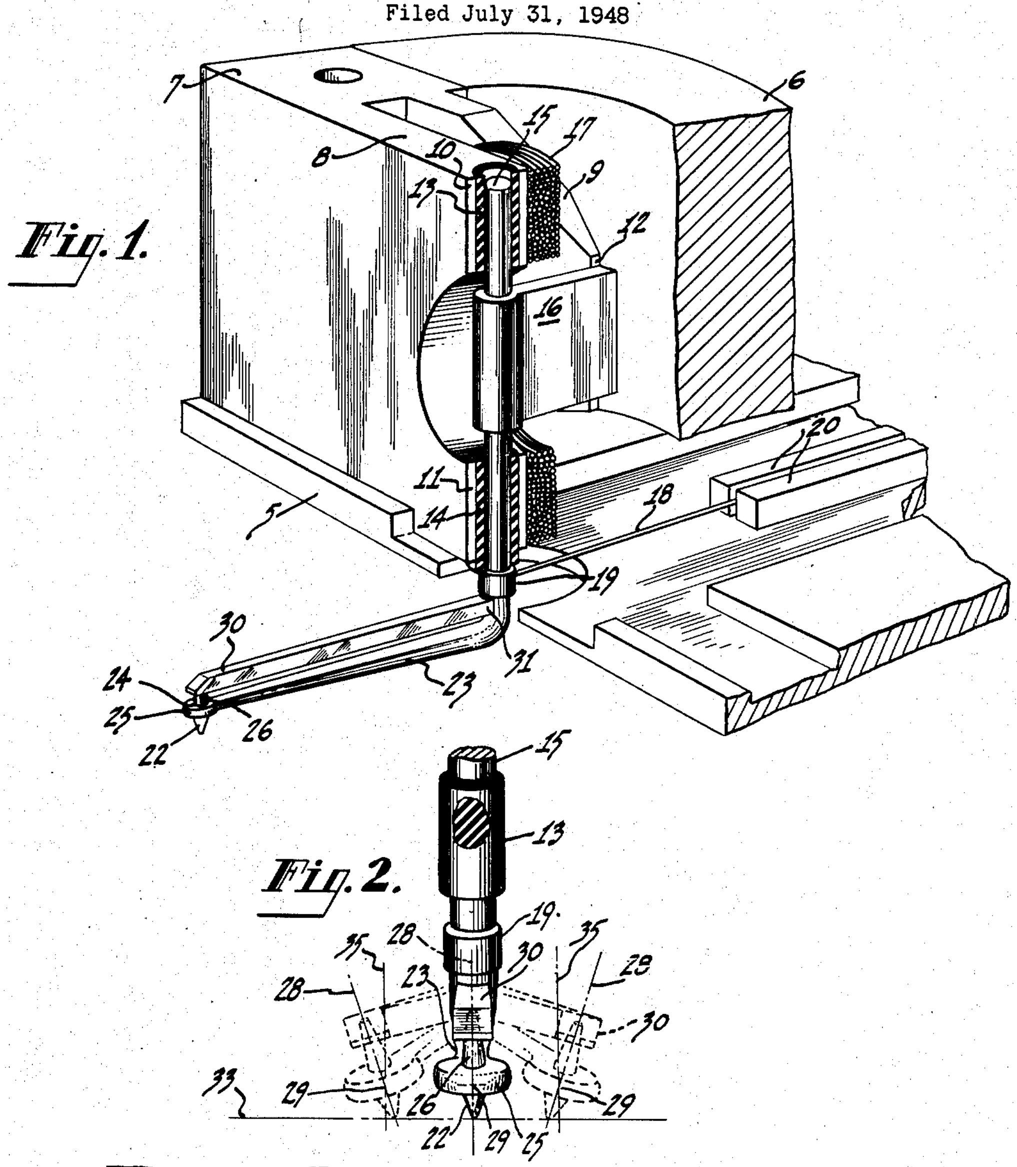

The present invention relates to phonograph pickup devices and the like, for translating sound recordings into and from undulatory electric currents corresponding thereto. Such translating devices generally comprise a pickup head mounted on a pivoted supporting means or tone arm and containing the translating mechanism which includes a vibratory armature system movable on a fixed pivot axis and a stylus connected therewith for engaging the record surface.

In the operation of such electromechanical sound translating devices, resonance may occur at various frequencies within the desired frequency response range of the device. With the advent of lighter weight and smaller pickup devices having extended high frequency response, the range of frequencies within which undesired resonances may occur is appreciably extended.

In such devices, the mass and stiffness of the support for each vibratory element becomes an important factor in the overall control of the operation of each portion of the vibratory system. At ultra high frequencies near the limit of audibility, control of such relatively small or miniature elements as the stylus is of importance, and it is a primary object of this invention to provide improved structure for supporting and controlling the mechanical response and resonance of the stylus element of a high-fidelity, light-weight phonograph pickup device or like translating apparatus.

In prior known electric pickup devices and the like, bodies of damping material, such as rubber or other vibration absorbing material, have been used extensively to engage and compress the entire moving or vibratory system, thereby loading the system at all frequencies, and as a consequence thereof, limiting the frequency response and frequency range of output to an undesired degree. In high-fidelity, high frequency sound translating devices, any compromise with fidelity for effecting control of resonance cannot be tolerated.

Accordingly, it is a further object of this invention, to provide in a sound translating device of the character referred to an improved stylus mounting and control means therefor which obviates the disadvantages of prior art devices and entirely eliminates the use of fixed compressed bodies of damping material in connection with the moving system.

The invention more particularly relates to the type of translating device which is provided with a sapphire, diamond or other hard relatively small and fine stylus element carried on the end of a vibratory supporting element or stylus arm which extends substantially parallel with the record surface and operates in connection with a substantially vertical pivot axis for the translation of lateral cut records and the like. In such devices it has been found that a resonance peak may occur at the upper end of a relatively wide frequency response range well above 10,000 cycles, and that resonance is due to the mass of the sapphire or stylus and holder in connection with the stiffness of the elongated stylus arm support therefor.

In the construction referred to, the axis of the stylus is substantially normal to a horizontal plane through the stylus support or arm, and in the reproduction of lateral cut records, the resonance tends to produce distortion in the stylus action and whipping of the stylus with respect to the point of contact with the record groove. This imparts to the vibratory system and the armature element or moving electrode of a pickup of the character referred to, an over-excursion and an over-voltage at the frequency of resonance, thereby introducing distortion in the electrical output.

It is, therefore, a still further object of this invention, to provide an improved mounting and damping or controlling means in a translating device of the character referred to, which is effective to prevent or reduce the resonance effect that occurs at a relatively high frequency in the normal frequency range for high-fidelity response, but which does not increase the stiffness or affect the operation of the moving vibratory system of the translating device at any other frequency, thus obviating the difficulties experienced in prior art devices, wherein the controlling means for one frequency adversely affected the operation of the device at other and lower frequencies.

A translating device of the phonograph pickup type to which the invention more particularly relates, and with which it is presently extensively useful is shown, described and claimed in a copending application of Earl E. Masterson, Serial No. 41,745, now Patent No. 2,560,358, issued July 10, 1951, for Phonograph Pickup Devices, and assigned to a common assignee.

Figure 3:
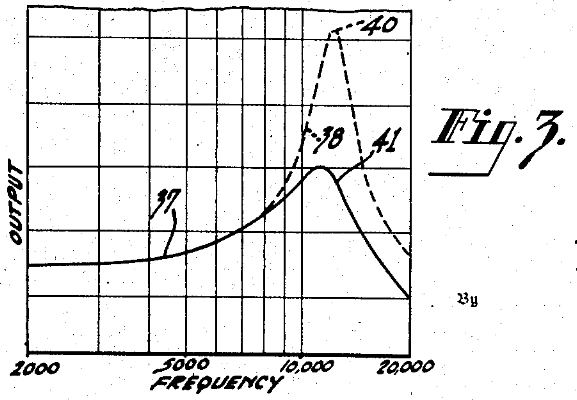

The novel features that are considered characteristic of the present invention are set forth with particularity in the appended claims. The invention itself, however, as well as additional objects and advantages thereof, will best be understood from the following description when read in connection with the accompanying drawing, in which:

Figure 1 is a greatly enlarged view in perspective, and partly in cross section, of a portion of an electromechanical translating device embodying the invention, Figure 2 is a front view of a portion of the structure of Figure 1, showing the mode of operation thereof in accordance with the invention, and Figure 3 is a graph showing curves illustrating an operating characteristic of the device of Figures 1 and 2.

Referring to Figures 1 and 2 in which like parts are designated by like reference characters, 5 is the base or frame of an electric phonograph pickup device forming part of the casing thereof on which is mounted a permanent magnet 6 having pole pieces, one of which is indicated at 7, each provided with lateral pole piece extensions 8 and 9 which meet centrally of the casing to provide respectively spaced bearing supports 10 and 11 on the extension 8 and a pole tip 12 on the extension 9. The supports 10 and 11 are recessed to provide, with like and complementary parts in the opposite half of the pickup (not shown), for gripping and holding two bearing sleeves 13 and 14 for the ends of a vertical pivot shaft 15 carrying an armature element 16 midway between the bearings.

A pickup winding or coil 17 is mounted between the pole piece extensions 8 and 9 and surrounds the armature 16 in spaced relation thereto. This coil provides for the generation of voltage in response to vibration of the armature 16 or, conversely, applies to the armature a variable mechanical motion corresponding to variations in the current therein depending upon whether the device is used for record reproduction or recording as is well known.

The armature is maintained in a normal central position in the air gap at the pole tip 12, by a straight rearwardly extending centering spring 18 which is secured at one end to the lower end of the pivot shaft 15 by means of a sleeve 19 and at the opposite end is locked between two deformable fingers 20 carried by the casing frame 5.

Any suitable pickup construction for high-fidelity, high frequency response having a vibratory system comprising an armature or electrode such as the armature 16 mounted on a vibratory pivot axis, such as provided by the shaft 15, would be adapted for application of the invention. In the present example, the armature extends into the air gap at the pole tip 12, it being understood that the portion of the translating device not shown is a duplicate of that illustrated.

In the type of translating device, however, to which the invention more particularly relates and as shown herein, the stylus 22 is carried in a forward position on the outer end of a forwardly extending stylus arm 23 which is secured to the lower end of the pivot shaft 15, in the present example being integral with the shaft. The stylus arm is flattened or otherwise rendered substantially rigid in a lateral direction while having a considerable degree of vertical compliance and is tapered to the tip end which holds the stylus 22. This is inserted through an opening 24 in the flattened free end 25 of the arm, and in accordance with the invention, projects upwardly through the opening in the form of an elongated extension 26 in axial continuation of the stylus 22, which is provided with a point or operating tip suitable for engaging the record groove, being adapted for record reproduction in the present example.

Normally, as is well known, sapphire and like stylus elements are relatively short and do not extend above the supporting means or holder, such as the arm in the present example. However, since the stylus arm 23 extends forwardly substantially at a right angle to the pivot shaft 15, lateral motion of the stylus 22 in response to energization from the lateral movement derived from the record groove may result in resonance at certain high frequencies. The stylus tip, which may be a usual fragment or splinter of a diamond ground to size and cut off, or a sapphire, and its holder, provide a considerable mass at the stylus tip at the higher frequencies. This mass resonates with the compliance of the supporting member between the stylus and the armature or pivot axis 15 at a certain high audio frequency, which may be of the order of 15,000 cycles, normally resulting in increased output at the frequency of resonance, which is undesirable. There is also a tendency of the stylus to leave the record groove at this frequency, which is further undesirable.

The above vibratory action of the stylus is indicated more clearly in Figure 2, showing the whipping action of the normally vertical stylus axis 28 about a center of rotation 29 at the holder or end of the supporting arm, through which the center of the stylus arm passes. This action indicates that at the frequency of resonance, the upper end of the stylus tip and the stylus holder, because of its mass, tends to vibrate with a wider excursion than the lateral excursion of the exciting groove carrying the relatively high frequency signal.

Any means in accordance with the prior art for damping such vibrations such as clamping the vibratory arm between resilient damping blocks would necessarily be effective at all frequencies and thereby limit the frequency response of the pickup device. In accordance with the invention, however, the stylus may be fragmented from a diamond or sapphire block or otherwise formed with the axial extension 26 which projects above the stylus arm to provide, with respect to the center of rotation 29, a lever arm to which is attached one end of an elongated body or bar 30 of damping material which extends along and above the stylus arm 23 and is connected with the arm adjacent to the pivot axis or at the lower end of the pivot axis or shaft 15, as indicated at 31, the attachment being made at both ends of the damping body by means of cementing or otherwise, to provide a rigid connection between the body of damping material and the points of attachment with the vibratory system of the pickup.

It will be noted that in no case is any connection made to a fixed support, whereby the damping is ineffective at lower frequencies to impair the operational response. In other words, with this arrangement it will be seen that at all frequencies of operation below the resonance frequency, the bar of damping material and the stylus arm move as a unit uniformly with the stylus and no appreciable damping action is applied to the moving system. When the high frequency of resonance is reached by the stylus tip, the stylus tends to vibrate as shown in dotted outline in Figure 2 and to move through a wider excursion than demanded by the record groove for that frequency. Since the upper end of the extension 26 is secured in or to the bar of damping material the bar of damping material is twisted or worked when the stylus tends to vibrate at the frequency of resonance and the damping material absorbs the energy and lessens the amplitude of the vibration, thereby effectively reducing the effect of the resonance on the output voltage of the pickup device.

The damping material is thus placed at a point of attachment sufficiently removed from the center of rotation of the stylus tip in response to undesired resonance so that the damping material is worked to a sufficient degree to impart a full damping action to the movement and to reduce the effect of the resonance, in some cases entirely eliminating any tendency to resonate.

Viewed in another of its aspects, the arrangement may be considered to comprise a vertical pivot shaft or axis of vibration for the vibratory system of the translating device, an elongated stylus substantially axially parallel with the axis of vibration and in spaced relation thereto being carried by an elongated support or stylus arm projecting from the axis of vibration substantially at a right angle thereto and engaging the stylus element intermediate between its upper and lower ends at a point which becomes the axis of rotation in response to undesired resonance in a vertical plane substantially parallel to the axis of rotation of the vibratory system. The body of damping material engages the upper end of the stylus element, whereby it is deformed or worked in response to a tendency to vibrate about the axis of rotation referred to and is secured, at a point removed therefrom, to the moving element which carries the stylus such as the stylus arm or the pivot shaft and preferably at the junction of the pivot shaft and stylus arm or adjacent the pivot axis, as shown in the drawing, the body of damping material being preferably somewhat elongated, the better to absorb the energy imparted to the pickup stylus.

As viewed in Figure 2, the stylus tip engages the record surface indicated by the dot and dash line 33, and is supported intermediate its ends at a point indicated by the center of rotation 29 and is connected at its opposite end with the body of damping material which imparts a frictional damping load thereto.

The degree of vibration is indicated by the angle between the normally vertical axis of the stylus, indicated by the line 35 and the center lines 28 at resonance. To offer maximum resistance or damping, the body of damping material 30 is spaced above the stylus arm by a distance at least equal to the distance below the stylus arm representing the point of contact of the stylus operating tip with the record, so that substantially equal and opposite forces are applied to the ends of the stylus element.

The dimensions of the device may be considered from the fact that in a preferred construction, the stylus 22 may have a body diameter of .015 inch and the length of the stylus arm may be of the order of .165 inch. The pivot shaft and integral arm may have a normal diameter of substantially .024 inch and formed preferably, from a Phosphor bronze wire. The flexible centering spring 18 may have a diameter of .006 inch and is preferably formed from a straight piece of music or steel piano wire.

The damping body may have a rectangular shape substantially as shown having a tapered forward end, and being of width of .040 inch and a thickness of .032 inch, approximately. The damping body may be formed of any suitable damping material such as gum rubber or of any soft, pliable and solid substance which is also substantially inert and self-supporting, such as a substance known commercially as "Glyptal," or another commercial product known as "Du Pont Viscoloid."

The elongated stylus elements are readily formed from diamond fragments or splinters, since such material is generally used for this purpose, the operating tip being ground to size and the remainder being cut off. In preparing such stylii for use in accordance with the invention, the splinters are used intact, without grinding off the opposite ends from the operating tips, which considerably reduces the cost of manufacture.

Referring to Figure 3, the signal output response characteristic from a pickup device as shown in Figure 1, is indicated by the curve comprising a solid portion 37 and a dotted portion 38 in continuation thereof having a peak 40. This curve is plotted between signal or voltage output and frequency, and shows the effect of the resonance of the stylus tip at a frequency above 10,000 cycles, such as a frequency of the order of 12,000 to 15,000 cycles. When, in accordance with the invention, the stylus tip is supported on an arm having predetermined stiffness and formed with an elongated upper end extending above the supporting arm, and a body of damping material is applied to the upper end of the stylus tip and secured to the moving system, no appreciable change in the response characteristic along the lower frequency portion 37 results. However, as indicated by the solid line continuation 41 of the curve 37, the undesirable higher frequency response peak is considerably reduced by the effect of the damping applied to the stylus by this arrangement.

The motion of the stylus is reduced or damped sufficiently to permit a reasonable extension of the frequency response of the translating device into the higher frequency region indicated, without having serious distortion in the output. This is of great importance in connection with high fidelity phonograph record reproduction and the like, as the trend in modern reproduction is to higher frequencies for greater fidelity of response. This arrangement effects the desired control of the resonance peak without affecting other portions of the response characteristic, as shown by the curves in Figure 3. Thus, in accordance with the invention, damping may be obtained which is highly effective on the vibratory system at the upper resonance peak, of a high-fidelity pickup device of the type shown, without affecting the overall stiffness. In any case, however, the damping material must be connected between an axial extension of the stylus above the point of support and a portion of the vibratory system such as the rear end of the arm or support rather than a fixed point of support, such as the base or body of the pickup device per se.

The projection of the stylus above the arm is found to be very effective and necessary to work the damping material, thereby increasing the effect of the damping to a higher degree than would be possible otherwise. The point of attachment of the damping material is relatively spaced from the center of rotation of the stylus arm at resonance, with the stylus projecting above and below the center of rotation. Thus, there is provided mechanical damping means in a high fidelity pickup device which is effective at a high frequency resonant peak, without increasing the stiffness of the moving system at any other frequency, and while the invention has been shown and described in connection with a present preferred form of pickup or translating device, it is not limited thereto but may be incorporated in other translating systems for high fidelity sound recording and reproduction.

I claim as my invention:

1. In a sound translating device for phonograph record reproduction and the like, the combination of means providing a pivot axis of vibration for the translating system thereof, an elongated stylus element having an operating tip at one end, a stylus arm operative about said pivot axis and having a free end engaging and holding said stylus element substantially intermediate the ends thereof, an elongated body of damping material secured at one end to said stylus element at the opposite end thereof from the operating tip, and means for anchoring said body of damping material in connection with the arm at a point adjacent to said pivot axis, whereby effective damping action is applied to said stylus element in response to undesired resonance about the axis of the stylus arm as a center of rotation.

2. In a sound translating device for phonograph record reproduction and the like, the combination of a normally substantially vertical pivot shaft, an elongated stylus element having an operating tip at one end, a stylus arm connected at one end with the lower end of said pivot shaft and extending substantially at a right angle thereto, means at the free end of the stylus arm for engaging and holding said stylus element substantially intermediate the ends thereof, and an elongated body of damping material secured to and extending along the stylus arm in substantially spaced relation thereto between the pivot shaft and the stylus element at the opposite end thereof from the tip, whereby effective damping action is applied to said stylus element in response to undesired resonance resulting from the mass of the stylus reacting with the stiffness of the stylus arm about the axis of said stylus arm as a center of rotation.

3. In a signal translating device of the phonograph record pickup type, the combination with a vibratory translating system including a pivot shaft and an armature element carried thereby, of an elongated stylus element having a record engaging tip and an elongated body in axial extension thereof, a stylus holding arm element attached at one end to said stylus intermediate the ends thereof and extending into operative connection with said pivot shaft as the operating axis for vibratory movement of said arm element and said arm element providing a center of rotation for said stylus element at a certain resonant frequency, and an elongated body of damping material connected at one end to the pivot shaft and attached at the opposite end to the stylus element in opposed relation to the record engaging tip, and said body of damping material extending along the arm element in spaced relation thereto between the stylus element and the pivot shaft, whereby the body of damping material and the arm element move as a unit at all frequencies of operation below said resonant frequency of the stylus element about the axis of said arm.

4. In a translating device for phonograph record reproduction and the like, the combination with a driving and a driven element, one of which is a stylus element, and an interconnecting motion transmitting element therefor, of an elongated axial extension for said stylus element, means carried by said motion transmitting element attached to the stylus element intermediate the ends thereof, and means for applying mechanical damping to the stylus element to effectively reduce excess motion caused expressly by mechanical resonance of the mass of the stylus element with compliance of the motion transmitting element and without affecting the transmission of motion at frequencies off said resonance, said last named means including a body of damping material attached to the extension of the stylus element and having a mechanical connection with the motion transmitting element at a point remote from the stylus element.

5. In a translating device for phonograph record reproduction and the like, the combination as defined in claim 4, wherein the stylus element is a fragmented diamond having a polished operating tip and an elongated body portion providing an axial extension thereof for connection with said body of damping material on the opposite side of the motion transmitting element from said operating tip.

6. In a high fidelity phonograph record reproducing system, the combination of a stylus element of relatively small size and mass for engaging a record groove, a light-weight elongated suspension arm having one end attached to said stylus element to hold said element in contact with a record groove, said stylus element depending from one side of said suspension arm and having an integral axial extension on the opposite side of said suspension arm, and a body of damping material attached at one end to said extension and at the opposite end thereof to said suspension arm at a point remote from said stylus, said body being freely movable in response to vibration of the stylus and arm within a relatively wide audio frequency range and providing effective damping of the stylus element at the resonant frequency thereof about the axis of said suspension arm as a center of rotation.

7. In a high fidelity phonograph record reproducing system, the combination as defined in claim 6, wherein the stylus element is a sapphire of relatively small diameter extending through said suspension arm substantially equal distances on opposite sides thereof, and wherein said body of damping material is substantially rectangular in cross section and elongated and joined mechanically with said stylus element in spaced relation to said suspension arm.

HENRY E. ROYS.

References Cited in the file of this patent

UNITED STATES PATENTS

| Number | Name | Date |
|---|---|---|
| 1,197,782 | Weber | Sept. 12, 1916 |
| 1,281,135 | Claybrook | Oct. 8, 1918 |
| 1,444,196 | Logan | Feb. 6, 1923 |
| 1,868,321 | Harrison | July 19, 1932 |
| 1,986,583 | King | Jan. 1, 1935 |
| 2,399,585 | Thompson | Apr. 30, 1946 |
| 2,430,476 | McClain | Nov. 11, 1947 |
| 2,455,913 | Bauer | Dec. 14, 1948 |
| 2,485,432 | Cornwell | Oct. 18, 1949 |

FOREIGN PATENTS

| Number | Country | Date |
|---|---|---|
| 402,575 | France | Oct. 12, 1909 |